UNITED STATES PATENT OFFICE.

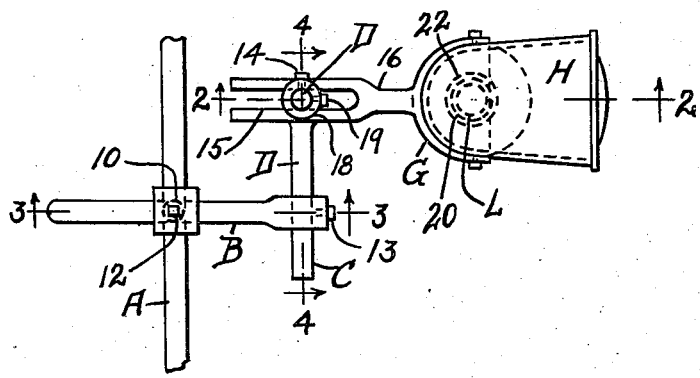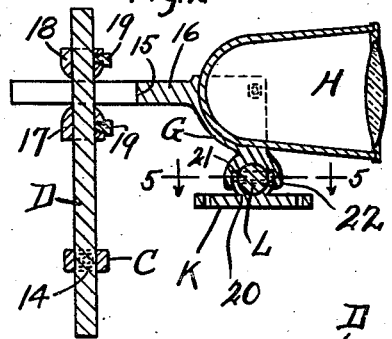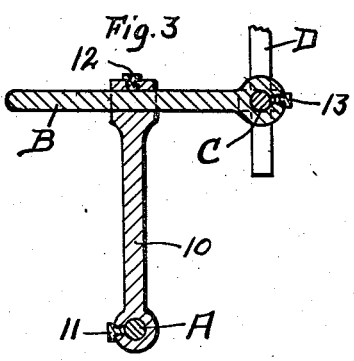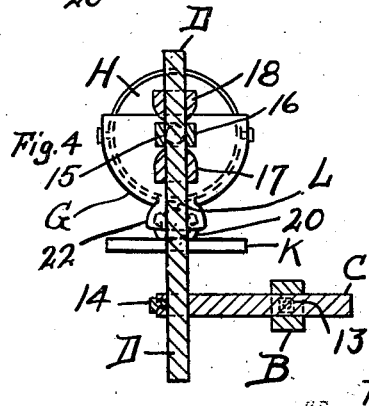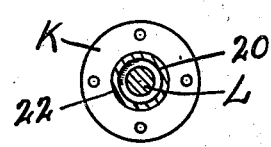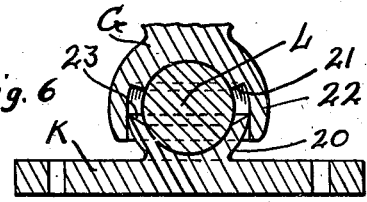

ARTHUR C. SCHAFFER, OF CLEVELAND, OHIO.

HEADLIGHT-CONTROLLING MEANS FOR AUTOMOBILES OR VEHICLES.

1,258,259.   Specification of Letters Patent.   Patented Mar. 5, 1918.

Application filed October 5, 1917. Serial No. 194,830.

*To all whom it may concern:*

Be it known that I, ARTHUR C. SCHAFFER, a citizen of the United States, residing at Cleveland, in the county of Cuyahoga and State of Ohio, have invented new and useful Headlight-Controlling Means for Automobiles or Vehicles, of which the following is a specification.

This invention relates to improvements in headlight-controlling means for automobiles or vehicles, and pertains more especially to apparatus comprising a bracket adapted to be employed in carrying a headlight and having such connection with an endwise shiftable rod employed in steering the front wheels of the vehicle that said bracket is actuated or turned laterally with and in the direction of the turning of the vehicle.

One object of this invention is to have said bracket supported from a single ball seated in and projecting above a cup-shaped member with which a plate to be secured to the frame or chassis, mud-guard, fender or other member of an automobile or vehicle is provided.

Another object is to insure adequate lubrication of said ball, and to exclude dirt, dust and water from the ball.

Another object is to provide improved means for transmitting motion to the hereinbefore mentioned bracket from the steering rod during the actuation of said rod.

Another object is to provide simple and improved means for adjusting said bracket independently of said rod.

With these objects in view, and to attain any other object hereinafter appearing, this invention consists in certain features of construction, and combinations and relative arrangement of the parts, hereinafter described in this specification, pointed out in the claims, and illustrated in the accompanying drawings.

In said drawings, Figure 1 is a top plan of apparatus embodying my invention and shows a portion of the steering rod employed in steering an automobile or vehicle and the operative connection between said rod and a bracket carrying a headlight. Fig. 2 is a vertical section taken along the line 2—2, Fig. 1. Fig. 3 is a vertical section taken along the line 3—3, Fig. 1, and only shows a portion of the apparatus illustrated in Fig. 1. Fig. 4 is a vertical section taken along the line 4—4, Fig. 1, looking forwardly. Fig. 5 is a horizontal section taken along the line 5—5, Fig. 2. Fig. 6 is an enlarged view of a portion of Fig. 2.

Referring to said drawings, A indicates a steering rod employed in steering the front wheels (not shown) of an automobile or vehicle. Steering apparatus for automobiles or vehicles and the manner of applying said steering rod are too well known in the art to require description in detail in this specification. Suffice it to state that said rod is arranged transversely of the vehicle, and that the front wheels (not shown) of the vehicle are connected with said rod in the usual manner whereby said wheels are turned to the right or to the left according as said rod is actuated endwise to the left or to the right.

The rod A is shown provided with an upwardly projecting vertically arranged arm 10 which is mounted on and adjustable endwise of said rod and secured to said rod in the desired adjustment of said arm by a suitably applied set-screw 11. A short rod B extends through the upper end of the arm 10 and is arranged substantially horizontally and at a right angle to the steering rod A and adjustable endwise. The rod B is secured to the arm 10 in the desired adjustment of said rod by a suitably applied set-screw 12. It will be observed therefore that the rod B is arranged to extend forwardly and rearwardly of the vehicle. Through the forward end of the rod B extends a short rod C shown arranged horizontally and substantially parallel with the steering rod A and therefore arranged substantially at a right angle to the rod B. The rod C is adjustable endwise and secured to the rod B in the desired adjustment of the rod C by a suitably applied set-screw 13. A vertically arranged post or rigid member D extends through one end of the rod C and is adjustable endwise or vertically and secured to said rod in the desired adjustment of said vertically adjustable post or member by a suitably applied set-screw 14. By the construction hereinbefore described it will be observed that the post or vertically adjustable member D is adjustable transversely and longitudinally of the vehicle.

The post or vertically adjustable member D engages a slot 15 formed in and extending vertically through and longitudinally of an arm 16 formed on a bracket G shown carrying a front lamp or headlight H. The bracket G is supported as will hereinafter appear and shown arranged forward of and in suitable proximity to the post or slot-engaging member D, and therefore the arm 16 projects or extends rearwardly. The slot-engaging member D extends above and below the bracket-arm 16 and is provided with two collars 17 and 18 arranged at the bottom and top respectively of said slot-engaging member and adjustable endwise of said slot-engaging member or vertically and secured to said slot-engaging member in the desired adjustment of the collars by suitably applied set-screws 19, and the arm-facing or adjacent ends of said collars are convex, as shown in Figs. 2 and 4.

The supporting means for the bracket preferably comprise a plate K which is shown arranged horizontally and adapted to be applied and secured in any approved manner to the frame or chassis, mud-guard, fender or other suitable member or portion of an automobile or vehicle. The plate K is provided with a cup-shaped member 20 arranged centrally of the plate, and a single ball L is seated in and projects above said cup-shaped member. The bracket G is rotatably mounted on the ball L and embraces and is adjustable on the upper portion of said ball. The bracket G has the edge 21 of its ball-engaging portion arranged substantially radially relative to said ball and spaced from the aforesaid cup-shaped member in the central position of the bracket. Said bracket is also shown provided with a downwardly projecting annular flange 22 surrounding the cup-shaped member 20 of the plate K, and said cup-shaped member has an inwardly curved sloping top edge 23, as shown in Fig. 6.

By the construction and relative arrangement of the parts hereinbefore described it will be observed that the slot-engaging member D and its collars 17 and 18 are employed in actuating the arm 16 of the bracket G upwardly or downwardly according as said collar-bearing member D is readjusted to elevate or lower it, and that when said bracket is in its central position, as shown, the head light carried by the bracket is turned upwardly or downwardly according as said collar-bearing member is elevated or lowered. It will also be observed that the collars 17 and 18 and the side walls of the slot 15 constitute means for holding the bracket-arm 16 in the desired adjustment of the bracket; that the headlight carried by the bracket is turned laterally in the one direction or the other according as the bracket-arm 16 is swung laterally in the one or the other direction; that said arm is swung laterally in the one direction or the other according as the collar-bearing member D is actuated or readjusted laterally in the one or the other direction; that the collars 17 and 18 on the bracket-arm-actuating member D constitute means for preventing movement of the bracket-arm vertically independently of said arm-actuating member, and that said collar-bearing member is actuated laterally in the one direction or the other according as the steering rod A is shifted endwise in the one or the other direction. It will be observed that through the medium of the endwise adjustability of the rods B and C the vertically-adjustable collar-bearing member D is rendered adjustable forwardly and rearwardly and laterally, and hence said collar-bearing member has the desired adjustability relative to the bracket G. In other words, the endwise shiftability of the rods B and C and the vertical adjustability of the collar-bearing member D permit a limited change in the position of the supporting plate K up or down, forwardly or rearwardly, and laterally in the one or the other direction. Not unimportant also is the radial arrangement of the edge or shoulder 21 of the ball-embracing portion of the bracket K to afford to the bracket a suitable range of oscillation on the ball. Another meritorious feature is the slope and arrangement of the top edge of the cup-shaped member 20 so as to face inwardly and thereby enlarge the lubricant-carrying capacity of said cup-shaped member, and it will be observed that the downwardly projecting annular flange 22 of the bracket is of service in excluding dust, dirt and water from the ball L.

What I claim is—

1. In headlight-controlling means for automobiles or vehicles, a supporting plate having a cup-shaped member, a ball seated in and projecting above said cup-shaped member, a bracket adapted to be employed in carrying a headlight and embracing the upper portion of and mounted on said ball and having an arm for actuating said bracket to turn said headlight, and means for holding said arm in the desired adjustment of said bracket on said ball.

2. In headlight-controlling means, a supporting plate having a cup-shaped member which is circular in plan, a ball seated in and projecting above said cup-shaped member, a bracket adapted to be employed in carrying a headlight and embracing the upper portion of and mounted on said ball, said bracket being adjustable to turn said headlight laterally in the one or the other direction, and means for securing said bracket in its desired adjustment on said ball.

3. In headlight-controlling means, a supporting plate having a cup-shaped member, a ball seated in and projecting above said cup-shaped member, and a bracket adapted to be employed in carrying a headlight and embracing the upper portion of and mounted on said ball, said bracket being adjustable in the direction required to turn said headlight downwardly or upwardly, and means for securing said bracket in its desired adjustment on said ball.

4. In headlight-controlling means, a supporting plate having a cup-shaped member which is circular in plan, a ball seated in and projecting above said cup-shaped member, a bracket adapted to be employed in carrying a headlight and embracing the upper portion of and mounted on said ball, and means for actuating said bracket, said bracket having a downwardly projecting annular flange extending circumferentially of and surrounding the aforesaid cup-shaped member.

5. In headlight-controlling means, a supporting plate having a cup-shaped member which is circular in plan, a ball seated in and projecting above said cup-shaped member, a bracket adapted to be employed in carrying a headlight and embracing the upper portion of and adjustably mounted on said ball, and means for securing said bracket in the desired adjustment, the edge of the ball-engaging portion of the bracket being arranged substantially radially relative to said ball and spaced from the aforesaid cup-shaped member in the central position of the bracket, and the bracket being provided with a downwardly projecting flange surrounding said cup-shaped member.

6. In headlight-controlling means, a supporting plate having a cup-shaped member, a ball seated in and projecting above said cup-shaped member, a bracket adapted to be employed in carrying a headlight and embracing the upper portion and mounted on said ball, and means for actuating said bracket, said bracket having a downwardly projecting annular flange extending around the aforesaid cup-shaped member, and said cup-shaped member having an inwardly facing sloping top edge.

7. In headlight-controlling means, a suitably supported ball, a bracket adapted to be employed in carrying a headlight and embracing the upper portion of and mounted on said ball and having an arm projecting in a substantially horizontal direction, which arm is provided with a slot extending vertically through and longitudinally of the arm, and a suitably supported laterally adjustable rigid member engaging said slot.

8. In headlight-controlling means, a suitably supported ball, a bracket adapted to be employed in carrying a headlight and embracing the upper portion of and mounted on said ball and having an arm projecting in a substantially horizontal direction, and a suitably supported rigid member for actuating said arm laterally and provided with means for preventing movement of said arm vertically independently of said arm-actuating member.

9. In headlight-controlling means, a suitably supported ball, a bracket adapted to be employed in carrying a headlight and embracing the upper portion of and mounted on said ball and having a rearwardly projecting arm provided with a slot extending vertically through and longitudinally of the arm, and a suitably supported rigid member engaging said slot and extending above and below said arm and employed in actuating said arm and provided with means for preventing movement of said arm vertically independently of said arm-actuating member.

10. In headlight-controlling means, a suitably supported ball, a bracket adapted to be employed in carrying a headlight and mounted on said ball and having an arm which projects in a substantially horizontal direction and is provided with a slot extending vertically through and longitudinally of the arm, a suitably supported rigid member extending vertically through said slot and above and below said arm, and two collars surrounding and carried by said slot-engaging member and arranged at the top and bottom respectively of said arm, the arm-facing ends of said collars being convex.

11. In headlight-controlling means, a suitably supported ball, a bracket adapted to be employed in carrying a headlight and mounted on said ball and having an arm which projects in a substantially horizontal direction and is provided with a slot extending vertically through and longitudinally of said arm, a suitably supported rigid member extending vertically through said slot and above and below said arm, and two collars surrounding said slot-engaging member and arranged at the bottom and top respectively of said arm and adjustable endwise of said slot-engaging member, and means for securing said collars in the desired adjustment.

12. In headlight-controlling means, a suitably supported ball, a bracket adapted to be employed in carrying a headlight and embracing the upper portion of and mounted on said ball and having an arm projecting in a substantially horizontal direction, and a laterally adjustable, vertically adjustable and forwardly and rearwardly adjustable member for actuating said arm laterally.

13. In headlight-controlling means, the combination, with a steering rod, of a suitably supported ball, a bracket rotatably mounted on said ball and adapted to be employed in carrying a headlight, and such a connection between said bracket and the aforesaid rod that said bracket is turned laterally on said ball in the one direction or the other according as said rod is actuated endwise in the one or the other direction.

14. In headlight-controlling means, a substantially horizontally arranged steering rod having an upwardly projecting arm, an endwise adjustable rod extending forwardly and rearwardly through the upper end of said arm and arranged substantially horizontally and at a right angle to said steering rod, means for securing the second-mentioned rod to said arm in the desired adjustment of said second-mentioned rod, a rod extending through one end of the second-mentioned rod and being substantially parallel with the steering rod and adjustable endwise, means for securing the third-mentioned rod to the second-mentioned rod in the desired adjustment of the third-mentioned rod, a suitably supported ball arranged above the aforesaid steering rod, a bracket rotatably mounted on said ball and adapted to be employed in carrying a headlight, and such a connection between said bracket and the third-mentioned rod that said bracket is turned laterally in the one direction or the other according as said steering rod is actuated endwise in the one or the other direction.

15. In headlight-controlling means, a steering rod, a rotatably mounted bracket adapted to be employed in carrying a headlight and capable of movement to turn said headlight laterally, a laterally adjustable, vertically adjustable and forwardly and rearwardly adjustable member capable of actuation to effect said movement of said bracket, and such a connection between said adjustable bracket-moving member and the aforesaid rod that said actuation of said adjustable bracket-actuating member is effected during the required actuation of said rod.

16. In headlight-controlling means, a steering rod, a rotatably mounted bracket adapted to be employed in carrying a headlight and having an arm which projects in a substantially horizontal direction and is provided with a slot extending vertically through and longitudinally of the arm, and a member engaging said slot and employed in actuating said arm laterally and adjustable independently of the aforesaid rod, and such a connection between said slot-engaging member and the aforesaid rod that said slot-actuating member is actuated laterally in the one direction or the other according as the said rod is actuated in the one or the other direction.

In testimony whereof, I sign the foregoing specification, in the presence of two witnesses.

ARTHUR C. SCHAFFER.

Witnesses:
CASPER J. DORER,
EMIL W. KEYZ.